US012657927B2

(12) United States Patent
Tananaev et al.

(10) Patent No.: US 12,657,927 B2
(45) Date of Patent: Jun. 16, 2026

(54) METHOD FOR DETECTING INFORMATION ABOUT AT LEAST ONE OBJECT AND/OR AT LEAST A PART OF FREE SPACE IN A REPRESENTATION OF THE ENVIRONMENT OF A SYSTEM

(71) Applicant: Robert Bosch GmbH, Stuttgart (DE)

(72) Inventors: Denis Tananaev, Sindelfingen (DE); Ze Guo, Berlin (DE); Steffen Abraham, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 538 days.

(21) Appl. No.: 18/155,112

(22) Filed: Jan. 17, 2023

(65) Prior Publication Data

US 2023/0230389 A1 Jul. 20, 2023

(30) Foreign Application Priority Data

Jan. 18, 2022 (DE) ..................... 10 2022 200 495.7
Dec. 22, 2022 (DE) ..................... 10 2022 214 331.0

(51) Int. Cl.
*G06V 20/58* (2022.01)
*G06V 10/774* (2022.01)
*G06V 20/70* (2022.01)

(52) U.S. Cl.
CPC ............ *G06V 20/58* (2022.01); *G06V 10/774* (2022.01); *G06V 20/70* (2022.01)

(58) Field of Classification Search
CPC ....... G06V 20/58; G06V 20/70; G06V 10/774
See application file for complete search history.

(56) References Cited

U.S. PATENT DOCUMENTS

| | | | | |
|---|---|---|---|---|
| 10,242,264 B1* | 3/2019 | Ten | ......................... | G06V 20/20 |
| 2017/0316281 A1* | 11/2017 | Criminisi | ............ | G06F 18/2148 |
| 2019/0026597 A1* | 1/2019 | Zeng | ...................... | G06V 10/82 |
| 2019/0258878 A1* | 8/2019 | Koivisto | ................. | G05D 1/00 |
| 2024/0312123 A1* | 9/2024 | Anwar | .................. | G06T 19/006 |

OTHER PUBLICATIONS

Facil, et al.: "CAMConvs: Camera-Aware Multi-Scale Convolutions for Single-View Depth," 2019 IEEE/CVF Conference on Computer Vision and Pattern Recognition (CVPR), pp. 11818-11827.

Jonchery, et al.: "A Stixel approach for enhancing Semantic Image Segmentation Using Prior Map Information," 2018 15th International Conference on Control, Automation, Robotics and Vision (ICARCV), IEEE, (2018), pp. 1715-1720.

Piewak, et al.: "Improved Semantic Stixels via Multimodal Sensor Fusion," arXiv:1809.08993v2, (2018), pp. 1-12.

Ramos, et al.: "Detecting Unexpected Obstacles for Self-Driving Cars: Fusing Deep Learning and Geometric Modeling," 2017 IEEE Intelligent Vehicles Symposium (IV), USA, IEEE, (2017), pp. 1025-1032.

* cited by examiner

*Primary Examiner* — Pinalben Patel
(74) *Attorney, Agent, or Firm* — NORTON ROSE FULBRIGHT US LLP

(57) ABSTRACT

A method for detecting information about at least one object and/or at least a part of the free space in a representation (4) of the environment of a system. The method comprises: a) performing ground truth generation; b) performing an obstacle and clearance detection; c) performing a generalization across different cameras and/or different digital image representations.

9 Claims, 4 Drawing Sheets

METHOD FOR DETECTING INFORMATION ABOUT AT LEAST ONE OBJECT AND/OR AT LEAST A PART OF FREE SPACE IN A REPRESENTATION OF THE ENVIRONMENT OF A SYSTEM

CROSS REFERENCE

The present application claims the benefit under 35 U.S.C. § 119 of German Patent Application Nos. DE 10 2022 200 495.7 filed on Jan. 18, 2022, and DE 10 2022 214 331.0 filed on Dec. 22, 2022, which are expressly incorporated herein by reference it their entireties.

FIELD

The present invention relates to a method for detecting information about at least one object and/or at least a part of free space in a representation of the environment of a system, particularly based on at least one or more digital image representations obtained from at least one or more cameras, and/or sensor data obtained from at least one active environmental sensor of the system, advantageously of a vehicle. Moreover, a computer program for performing the method, a machine-readable storage medium having the computer program, and an object detection system for a vehicle are provided according to the present invention. The present invention may in particular be used in the realization of at least partially automated or autonomous driving. Furthermore, the present invention may also be used in robotic systems, in particular for at least a partially automated or autonomous operation.

BACKGROUND INFORMATION

In advanced robotic systems, a key technology of the perception system is to recognize where the robot can go and where the obstacles are located. The conventional method of using classical computer vision techniques is complex and does not work end-to-end. In contrast, deep learning techniques typically work in the image area and rely on active 3D-sensors (such as LiDAR, radar, etc.) to capture 3D information. Such multi-sensor systems are complex and expensive, and it takes a great deal of engineering to synchronize and fuse the information from various modalities.

SUMMARY

A method for detecting information about at least one object and/or at least a part of free space in a representation of the environment of a system is provided according to the present invention. According to an example embodiment of the present invention, the method comprises at least the following steps:
- a) performing ground truth generation;
- b) performing obstacle and free space detection;
- c) performing generalization across different cameras and/or different digital image representations.

For example, steps a), b) and c) may be performed at least once and/or repeatedly in the order indicated to perform the method. Furthermore, steps a), b) and c) may be performed at least in part in parallel or simultaneously. For example, step a) may be performed to generate training data for a machine-learning algorithm and/or a machine-learning system, such as an artificial neural network. Steps b) and/or c), in particular step b), may be performed, for example, during the application of the trained algorithm or machine-learning-capable system. For example, between steps a) and b), a training of the machine-learning algorithm and/or the machine-learning system, particularly the artificial neural network, may be performed, particularly using the information generated in step a).

This example method may be used in connection with detecting information about at least one object and/or at least a part of free space in a representation of the environment of a system, particularly based on at least one or more digital image representations obtained from at least one or more cameras, and/or based on sensor data obtained from at least one active environmental sensor of the system. For example, the system may be a vehicle, such as a motor vehicle. For example, the vehicle may be an automobile. The vehicle or system may be configured for an at least partially automated or autonomous (driving) operation.

The detection can, for example, be a machine and/or sensory detection or capture. For example, the object may be other road users, such as other vehicles, pedestrians, or the like. Furthermore, the object may be, for example, an infrastructure facility, such as a traffic light system, a signage, or the like. The free space may be in particular the space or clearance in which the system may (freely) operate and/or move into without colliding with an object. The information can, for example, concern the (relative) position or the in particular spatial or absolute distance to the object or space and/or the spatial extension or dimension or propagation of the object or space.

According to an example embodiment of the present invention, in step a), a ground truth generation is performed. In particular, in step a), automatic ground truth generation may occur. Advantageously, an automatic 3D obstacle stixel ground truth generation may be performed. The "ground truth" may in particular comprise a plurality of data sets that describe a basic knowledge for training a machine-learning algorithm and/or a machine-learning system, such as an artificial neural network. The basic knowledge can in particular relate to a sufficient number of data sets in order to be able to train a corresponding algorithm or a corresponding system for an image evaluation.

The term "ground truth" may alternatively or additionally relate herein to, for example, a ground reality, ground truth and/or a field comparison. The ground truth generation advantageously allows that in the analysis of information from the representation of the environment ground truth data, particularly ground data, or data for describing the ground (position and/or path) can be included in the representation of the environment. In particular, the ground truth data may provide additional information and/or reference information about circumstances and/or dimensions and/or ratios in the representation of the environment. The ground truth data may in particular help to describe where a (potential) object stands on the ground or comes into contact with the ground discernible in the representation. For example, the ground truth data may help to more specifically capture or describe a (reference) object in the representation. In particular, the ground truth data may help to ensure that information from the representation is more precisely classified and/or the result of the classification can be reviewed for correctness.

Thus, the ground truth data may particularly advantageously contribute to training a machine-learning algorithm and/or a machine-learning system, in particular an artificial neural network. In particular, the machine-learning algorithm and/or the machine-learning system, in particular the artificial neural network, can thus learn to recognize in a (two-dimensional) image representation, at which location a (potential) object stands on the ground or comes into contact with the ground detectable in the representation. Furthermore, it is thus also advantageously possible to learn to detect at least one object or a stixel describing the object that stands at a corresponding ground location.

A "stixel" can be understood as an in particular rectangular (3D) data structure, which describes a certain area of a scene or the representation. Each stixel may contain the relative position with respect to the camera or sensor (which acquired the representation), the height and/or the disparity, and thus advantageously the depth with respect to a potential object. This data structure is typically "standing" on the ground. For example, ground truth generation may help obtain information about the position and/or extension of the ground in the representation. Further, each stixel typically has a fixed stixel width. The aim of using stixels is typically the abstraction of the 3D image data by an additional representation layer (stixels).

According to an example embodiment of the present invention, between steps a) and b), for example, a training of a machine-learning algorithm and/or a machine-learning system, in particular an artificial neural network, can be performed based on the generated ground truth. In order to realize the artificial neural network, a convolutional neural network (CNN) can particularly advantageously be used here.

According to an example embodiment of the present invention, in step b), an obstacle and free space detection is performed. In particular, in step b), an obstacle stixel and free space detection may occur. Advantageously, an end-to-end obstacle stixel detection in 3D and free space detection can be performed. Particularly preferably, a 3D obstacle and free space detection can be performed of or in 2D image representations.

The term "end-to-end" describes in particular a continuous detection by the same (evaluation) means, for example by the same algorithm and/or the same artificial neural network. Thus, advantageously the obstacle and free space detection, and particularly advantageously the entire method, can be performed within a (single) artificial neural network.

According to an example embodiment of the present invention, in step c), a generalization is performed across different cameras and/or different digital image representations. This may in particular include use of data from different cameras and a generalization of an algorithm on different cameras. The method may advantageously contribute to or be performed for generating training data for artificial object detection algorithms.

According to one advantageous configuration of the present invention, it is provided that the representation of the environment of the system is based (at least also) on sensor data obtained from at least one active environmental sensor of the system and that the at least one active environmental sensor comprises a LiDAR sensor and/or a radar sensor. Preferably, the active environmental sensor is a LiDAR sensor.

According to another advantageous configuration of the present invention, it is provided that the method of training a system and/or a deep learning algorithm for detecting drivable spaces and obstacle information is performed. The method may be performed for training at least one artificial neural network. The method may be performed for the (automated) generation of training data for at least one artificial neural network. The method may train the system or an artificial neural network, for example, with data that are also based on sensor data, in particular LiDAR data, in order to be able to determine at least information on the height of an obstacle and the distance to an obstacle in operation from a single image. For example, the method may be performed for training a deep convolutional neural network.

According to a further advantageous configuration of the present invention, it is provided that a label generation for the free space is performed in step a). This may be done in particular including determining a free space end point position for each image column. The image column width may correspond to a stixel width.

According to a further advantageous configuration of the present invention, it is provided that in step a), a label generation for at least one obstacle is performed. This may be done in particular including the determination of an obstacle position in the image representation and determining the 3D distance to the object.

According to a further advantageous configuration of the present invention, it is provided that in step b) obstacle lower-points and/or obstacle upper-points are determined and/or at least a free space boundary is determined.

According to a further advantageous configuration of the present invention, it is provided that a focal length normalization is performed in step c).

In yet another aspect of the present invention, a computer program for performing a method presented herein is provided. In other words, this relates in particular to a computer program (product) comprising instructions that, when the program is executed by a computer, cause the computer to perform a method described herein.

According to a further aspect of the present invention, a machine-readable storage medium is provided on which the computer program proposed herein is saved or stored. Normally, the machine-readable storage medium is a computer-readable data carrier.

In another aspect of the present invention, an object detection system for a vehicle is provided, wherein the system is configured to perform a method described herein. The system may for example comprise a computer and/or a control unit (controller) that can execute instructions to perform the method. For this purpose, the computer or the control unit can, for example, execute the specified computer program. For example, the computer or the control unit may access the specified storage medium in order to execute the computer program.

The details, features and advantageous configurations of the present invention discussed in connection with the method may also occur in the computer program and/or storage medium and/or system presented herein, and vice versa, respectively. In this respect, reference is made to the statements therein regarding the more detailed characterization of the features in full.

The provided solution as well its technical environment are explained in further detail below with reference to the figures.

It should be noted that the present invention is not to be limited by the embodiment examples shown. In particular, unless explicitly shown otherwise, it is also possible to extract partial aspects of the features explained and shown in the figures and to combine them with other parts and/or findings from other figures and/or the present description.

DETAILED DESCRIPTION OF EXAMPLE EMBODIMENTS

Figure 1:
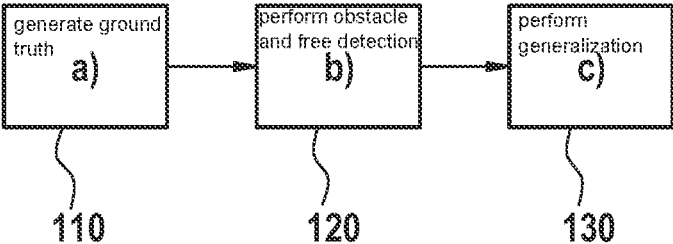
FIG. 1 shows an exemplary sequence of a method according to an example embodiment of the present invention.

FIG. 1 schematically shows an example of a sequence of a here-proposed method. The method is used for detecting information about at least one object 1, 2, and/or at least a part of free space 3 in a representation 4 of the environment of a system. The order of the method steps a), b) and c) shown with the blocks 110, 120 and 130 typically arises with a regular operating procedure.

In block 110, according to step a), a ground truth generation is performed. In block 120, according to step b), an obstacle and free space detection is performed. In block 130, according to step c), generalization is performed across different cameras 5 and/or different digital image representations. For example, between blocks 110 and 120, a training of a deep learning algorithm, such as a convolutional neural network, may be performed based on the generated ground truth.

In one advantageous embodiment, the method may combine the ability of deep learning to precisely detect objects in the image area, the regression of 3D-information, and/or the representation of concise features to advantageously enable autonomous capabilities for embedded camera-based perception systems, particularly without the need for additional expensive 3D sensors.

In one advantageous embodiment, the method may provide an advantageous framework for forming a continuous system for detecting drivable space and obstacle information for the perception unit, in particular, of an (advanced) driver assistance system and/or of an at least partially autonomous driving system or another mobile robotic system.

A stixel may describe a compact representation of the traffic environment. In a comparatively simple form, a stixel may represent the start position of a (first) obstacle from the ego vehicle in 3D. The method may contribute to an advantageous end-to-end obstacle stixel prediction using deep learning techniques. The method may provide 3D information, such as depth and object height, which is advantageous for autonomous systems having only one camera.

The detection of free spaces 3 can be done by semantic segmentation. However, semantic segmentation is typically an expensive representation, as it predicts a class for each pixel. The method may contribute to an advantageously compact representation of the free space, in particular with regard to the combination of stixel and free space search (which go hand in hand) in an end-to-end framework or a continuous approach.

An advantageous embodiment of the method may comprise at least one or more of the following aspects:

A 3D ground truth for obstacles can be obtained from semantically labeled point cloud data and/or a boundary of the free space from semantic segmentation images.

A unified neural network for predicting obstacle stixels incorporating the 3D information and/or the free space boundary may be provided, in particular, in a continuous manner.

The method may help to generalize the training and use of a neural network for cameras having different intrinsic parameters.

An advantageous embodiment of the method may have at least one or more of the following advantages:

An automated method for obtaining 3D obstacle position ground truth from semantically labeled point clouds can be provided.

In contrast to conventional methods that only provide the stixel as 2D information in the image, a neural network can be obtained that can predict the obstacle position in 3D and in free space together directly from a single image. The generated 3D data may be sent and used for creating environmental models for automated driving. Compared to conventional methods, the present invention may reduce the computational cost in implementing embedded software.

An algorithm according to the present invention may advantageously allow the data from different cameras having different intrinsic parameters to be used and combined for the training of a network. This may allow for the reuse of existing training data for new projects and advantageously saves costs. Additionally, and advantageously, already trained networks can be applied to various cameras without re-training. This can reduce the effort involved in the development process.

The present invention can advantageously enable the same autonomous capabilities for pure camera systems as for systems that include expensive active sensors (e.g. LiDAR, radar, etc.).

An advantageous embodiment of the method may comprise at least one or more of the following steps:

automatic generation of a 3D obstacle stixel ground truth end-to-end obstacle stixel detection in 3D and free space detection A method of using data from different cameras and generalizing the algorithm to different cameras.

In addition to being based on image captures from at least one camera, the representation 4 of the environment of the system may in particular be based at least also on sensor data obtained from at least one active environmental sensor of the system. The active environmental sensor may be, by way of example and preferably, a LiDAR sensor.

Figure 2:
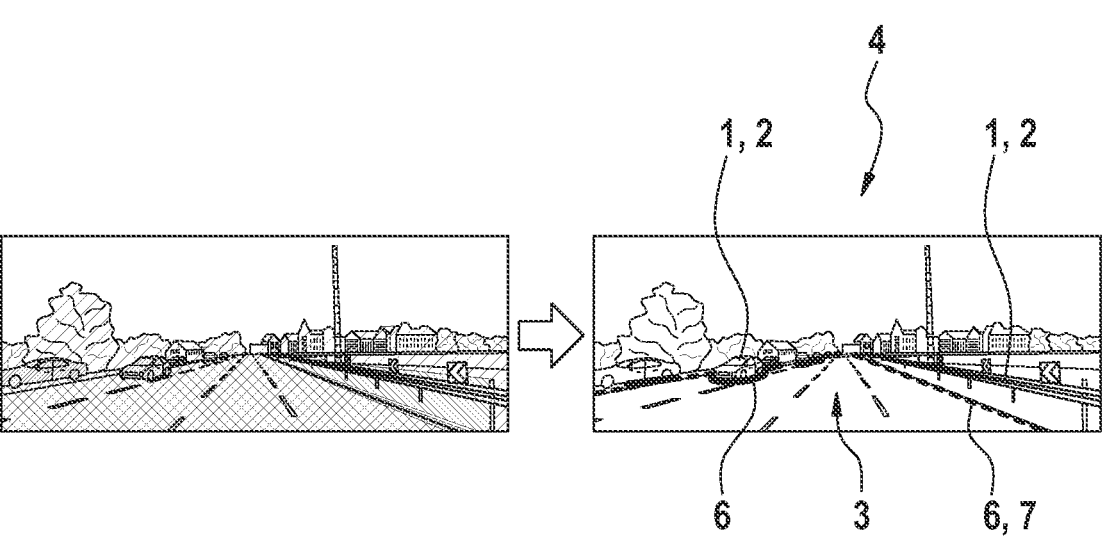
FIG. 2 shows an example of an overview over the generation of the ground truth.

FIG. 2 shows an example of an overview over the generation of the ground truth for the free space 3.

An advantageous embodiment of the method may include an automatic generation of the ground truth.

The generation of the ground truth may include an identification or label generation for the free space 3. An exemplary overview over a label generation for free spaces is shown in FIG. 2. An input for label generation for free spaces may be: at least one image+at least one semantic segmentation label for this image. An output of the label generation for free spaces may be: a free spaces end point position for each image column 9. An input for generating a label for the free space boundary 7 for an image may be a corresponding semantic segmentation image. Starting from the lower edge of the image, the method can search for the first obstacle point 6 it can find for each image column 9 and record its row number.

This provides an example for the fact that and possibly how in step a) a label generation for the free space 3 can be performed.

Furthermore, this provides an example for the fact that and possibly how in step b) obstacle lower points and/or obstacle upper points 6 can be determined and/or at least one free space boundary 7 can be determined.

The generation of the ground truth may include label generation for obstacles 2. An input for label generation for an obstacle 2 may be: semantically labelled (LiDAR) point cloud+camera, LiDAR poses+extrinsic and intrinsic camera parameters+images from the same timestamp. An output of the label generation for an obstacle 2 may be: Position of the obstacle in the image plane+semantic class of the obstacle+ associated depth of the obstacle as 3D distance 8 to the object 1. An exemplary overview of this functionality is shown in FIG. 3.

This provides an example for the fact that and possibly how in step a) a label generation can be performed for at least one obstacle 2.

Figure 3A:
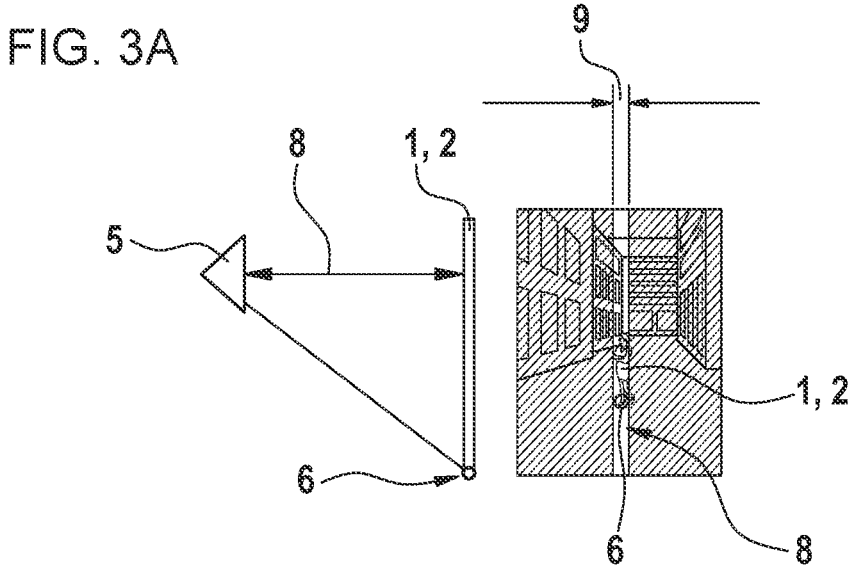
FIGS. 3A and 3B show an exemplary embodiment of the method according to the present invention.
Figure 3B:
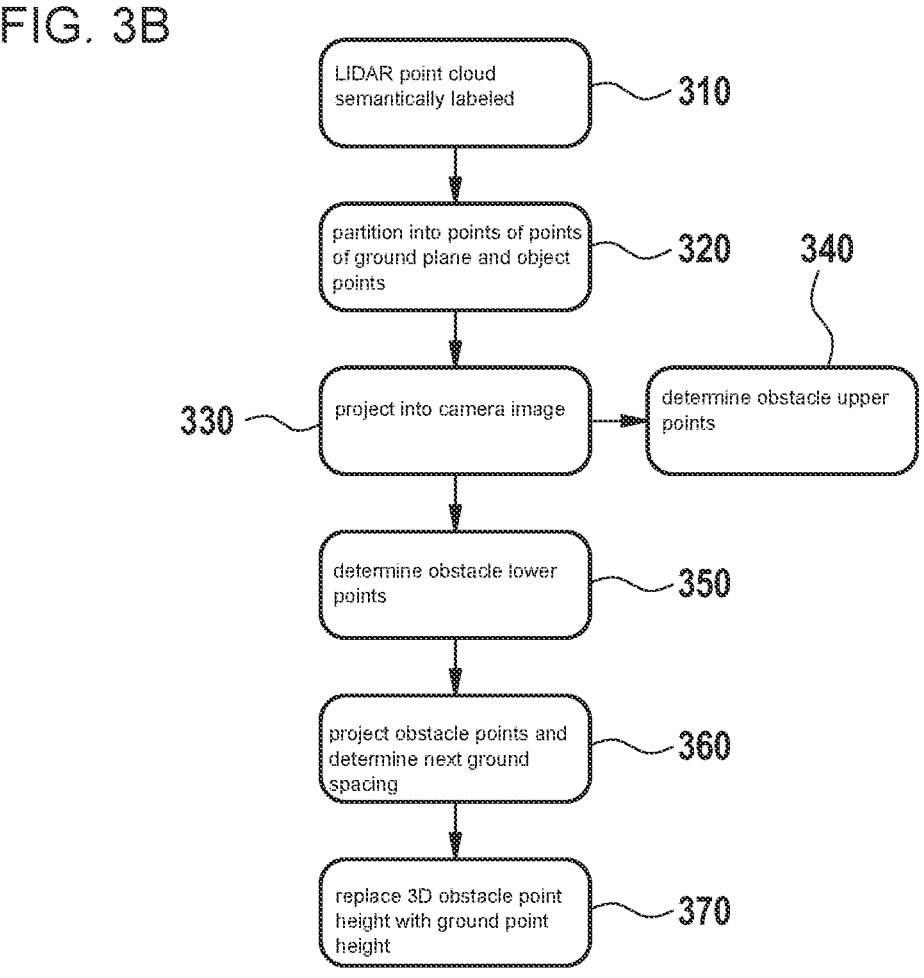

FIGS. 3A and 3B show an exemplary embodiment of the method, in particular with respect to the aspect of generating a three-dimensional ground truth, such as in step a).

It is illustrated in FIG. 3A that a LiDAR point cloud can be reprojected onto a (camera) image. Within an image column 9, the associated LiDAR points can be divided into the ground points and the obstacle points 6. Within the set of the obstacle points 6, the distance 8 of the point closest to the camera 5 may be used as the relevant distance of the stixel relative to the object column.

Figure 4:
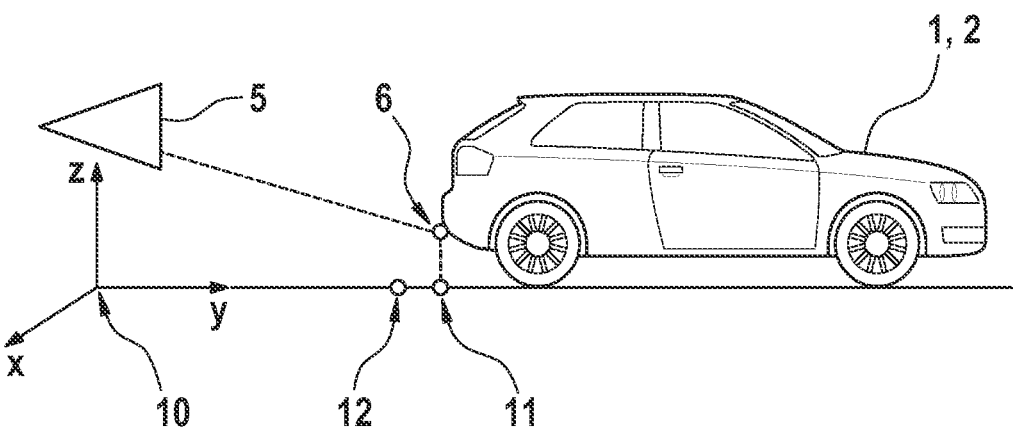
FIG. 4 shows an exemplary application possibility of the method according to the present invention.

Advantageously, the point of a hanging obstacle 6 (e.g., raised rear part of an automobile) may actually emanate from the ground rather than from the hanging obstacle, since the area below the hanging obstacle is typically not drivable for the ego automobile, i.e., it can theoretically also be part of the obstacle. An example of this is shown in FIG. 4. The relevant point is entered as the object-ground distance 12 in FIG. 4.

FIG. 3B illustrates a sequence of an advantageous embodiment of the method, in particular for performing step a).

In block 310, a LiDAR point cloud may occur which advantageously is or may be semantically labelled.

In block 320, a partitioning into and/or a selection of points of the ground plane and object points can occur.

In block 330, 3D points may be projected into a camera image, particularly to filter out (LiDAR) object points that are outside the camera field of view.

In block 340, finding or determining obstacle upper points 6 (upper end of obstacle 2 or object 1) for each image column 9 can occur.

In block 350, finding or determining obstacle lower points 6 (lower end of obstacle 2 or object 1) for each image column 9 can occur.

In block 360, projecting the obstacle points 6 in 3D as well as finding or determining the next (ground) spacing 8 (ground point with the least distance) can occur.

In block 370, replacing the 3D obstacle point height with a ground point height can occur. In addition, a back projection can be made into the image plane.

FIG. 4 shows an exemplary application possibility of the method. An automobile is detected in a rear view. In FIG. 4, a ground coordinate system 10, a ground distance 11 as well as an object-ground distance 12 are indicated. In connection with the foregoing explanations, FIG. 4 shows an example of determining the correct 3D point for the obstacles 2.

An advantageous embodiment of the method may include an end-to-end obstacle stixel and free space detection. This may also be described as a continuous obstacle stixel and free space detection.

An input for obstacle stixel and free space detection may be a single image (here, for example, a rear view of a rear of the vehicle). An output of the obstacle stixel and free space detection may be: Position of lower and upper obstacle point 6 in the image plane+distance values 8 of the obstacle point in 3D+semantic obstacle class. An exemplary overview of this module is shown in FIG. 5.

Figure 5:
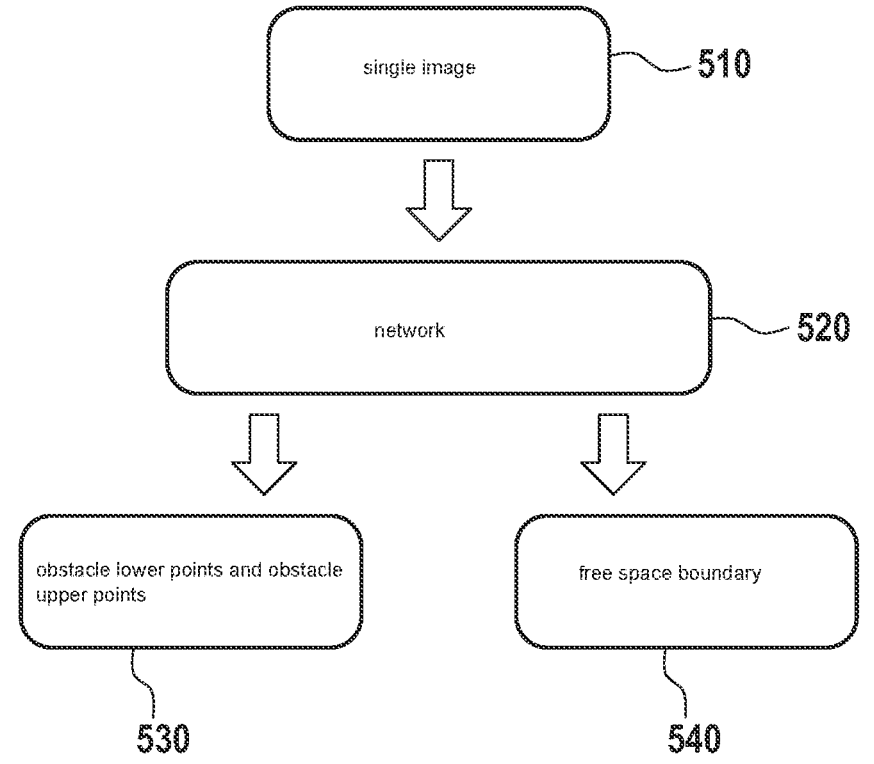
FIG. 5 shows an exemplary system for performing an object detection method, according to the present invention.

FIG. 5 shows an exemplary system for performing an object detection method, with a deep neural network 520 configured to perform the method and/or trained using the method described herein.

In an advantageous embodiment of the method, a deep multitasking neural network may be used for end-to-end prediction of obstacles and free spaces and/or may be trained according to the method. In particular, with labels generated from an automated label generation pipeline, a model according to an advantageous embodiment of the method may be trained in a monitored manner.

This provides an example for the fact that and possibly how the method for training a system and/or a deep learning algorithm for detecting drivable spaces and obstacle information may be performed.

The method may train the system or an artificial neural network, for example, with data that are also based on sensor data, in particular LiDAR data, so that the trained network during operation can determine from a single image at least information on the height of an obstacle and the distance to an obstacle.

As a possible input, a single image 510 may be provided to the network 520. Possible outputs of the network 520 may be obstacle lower points and obstacle upper points (as well as, if indicated: position, depth, class) 530 and a free space boundary 540.

In particular, in order to save computational time and memory space, the prediction is advantageously not performed for each individual image column 9, but may be performed at an interval (e.g., all 8 pixels). For example, for an input image having a width of 800, a prediction interval (or stixel width) of 8 pixels may be used.

Figures 6, 7:
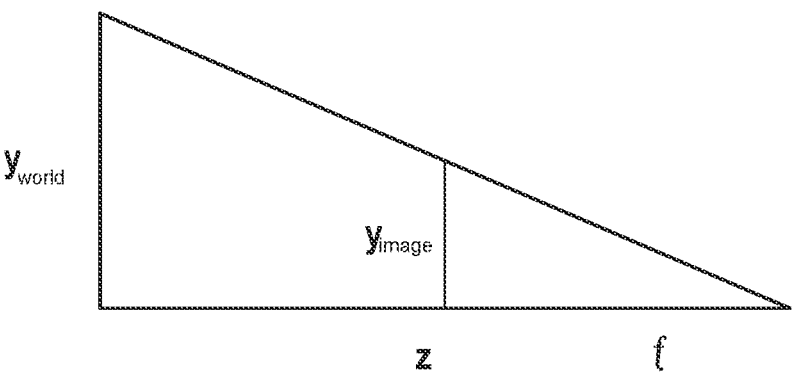
FIG. 6 shows an application example of the method, according to the present invention.
FIG. 7 shows an example of focal length normalization.

Particularly with a backbone, which may be a deep convolutional neural network as a feature extractor, advantageously 6 different task headers can be branched off from the backbone feature:

Task header for the prediction of the position of the obstacle ground point
  Form: 1×100
Task header for the prediction of the position of the upper obstacle point
  Form: 1×100
Task header for the prediction of the depth of the obstacle
  Form: 1×100
Task header for the prediction of the obstacle class
  Form: C×100, C is the total number of classes
Task header for the prediction of the free space boundary
  Form: 1×100
Task header for the prediction of the free space boundary classification (which classes the free space affects)
  Form: S×100, S is the total number of free space classes FIG. 6 shows an example of the application of the described method. In particular, FIG. 6 shows an example of model output in this context.

An advantageous embodiment of the method may include a generalization to different cameras.

An exemplary overview of this aspect of the method is shown in FIG. 7.

As shown as an example in FIG. 7, depth prediction is an advantageous part of the method or approach because it is highly dependent on the camera focal length. In training, a neural network associates object sizes of objects in the image with 3D distances from the sensor, e.g., LiDAR data. Using another camera with a different focal length may cause the object size in the image to be different for objects at the same distance. Thus, predicting a model trained with images from one camera may be less accurate on images from another camera (different focal length).

According to an advantageous embodiment of the method, focal length normalization may be used. The focal length normalization may advantageously be used to mitigate the problem described and/or to enable training with images from different cameras and/or to generalize performance across different cameras.

In the case of a pixel in the image, e.g. an obstacle point 6, the depth prediction typically depends on the real size of that point and the focal length of the camera (as shown as example in FIG. 7). When a model is trained to predict depth, it may advantageously be trained to implicitly find out the relationship between the size of the real world (y world) and the focal length (f), which may be quite difficult.

The focal length normalization may advantageously help to decouple the dependence on the focal length f by scaling the depth ground truth z by the corresponding focal length to a normalized distance dn=z/f. Particularly advantageously, this normalized distance may be used as a learning objective.

In a predictive step, the actual 3D depth z' may be recovered, in particular by scaling the model output dn' with the corresponding focal length value f' of the new camera: z'=dn'*f.

In this way, the method may facilitate depth learning and/or advantageously enable the use of different images from different cameras and/or generalization of the prediction across different cameras.

The method may be advantageously used to improve the performance of depth prediction and/or consistency across multiple cameras.

An example of focal length normalization may look like this:

For each pixel $y_{image}$=1, z=$y_{world}$

Instead of predicting z, $$y_{world} = \frac{z}{f}$$

may be predicted $$z_{predicted}=y_{world\_predicted} f$$

This provides an example for the fact that and possibly how in step c) a focal length normalization can be performed.

What is claimed is:

1. A method for detecting information about at least one object and/or at least a part of free space in a representation of an environment of a system, the method comprising the following steps:
a) performing a ground truth generation;
b) performing an obstacle and free space detection using a neural network trained based on the generated ground truth; and
c) performing a generalization of the obstacle and free space detection across different cameras and/or different digital image representations,
wherein the ground truth generation and the obstacle and free space detection involve a stixel-based representation comprising generating or using 3D stixels that include position, height, and depth information for objects in the environment,
wherein the obstacle and free space detection are performed in an end-to-end manner using a single neural network configured to simultaneously predict obstacle stixels and free space boundaries.

2. The method according to claim 1, wherein the representation of the environment of the system is based on sensor data obtained from at least one active environmental sensor of the system.

3. The method according to claim 1, wherein the method is performed for training a system and/or a deep learning algorithm for detecting drivable spaces and obstacle information.

4. The method according to claim 1, wherein in step a) a label generation for the free space is performed.

5. The method according to claim 1, wherein in step a) a label generation is performed for at least one obstacle.

6. The method according to claim 1, wherein in step b): (i) obstacle lower points and/or obstacle upper points are determined, and/or (ii) at least one free space boundary is determined.

7. The method according to claim 1, wherein in step c), a focal length normalization is performed.

8. A non-transitory machine-readable storage medium on which is stored a computer program for detecting information about at least one object and/or at least a part of free space in a representation of an environment of a system, the computer program, when executed by a computer, causing the computer to perform the following steps:
a) performing a ground truth generation using a neural network trained based on the generated ground truth;
b) performing an obstacle and free space detection; and
c) performing a generalization of the obstacle and free space detection across different cameras and/or different digital image representations,
wherein the ground truth generation and the obstacle and free space detection involve a stixel-based representation comprising generating or using 3D stixels that include position, height, and depth information for objects in the environment,
wherein the obstacle and free space detection are performed in an end-to-end manner using a single neural network configured to simultaneously predict obstacle stixels and free space boundaries.

9. An object detection system for a vehicle, the system configured to detect information about at least one object and/or at least a part of free space in a representation of an environment of the system, the system configured to:
a) perform a ground truth generation using a neural network trained based on the generated ground truth;
b) perform an obstacle and free space detection; and
c) perform a generalization of the obstacle and free space detection across different cameras and/or different digital image representations,
wherein the ground truth generation and the obstacle and free space detection involve a stixel-based representation comprising generating or using 3D stixels that include position, height, and depth information for objects in the environment, wherein the obstacle and free space detection are performed in an end-to-end manner using a single neural network configured to simultaneously predict obstacle stixels and free space boundaries.

* * * * *